United States Patent
Truemper

(10) Patent No.: US 10,155,589 B2
(45) Date of Patent: Dec. 18, 2018

(54) COOLING ARRANGEMENT FOR A GALLEY AND METHOD FOR OPERATING SUCH A COOLING ARRANGEMENT

(71) Applicant: AIRBUS OPERATIONS GMBH, Hamburg (DE)

(72) Inventor: Torsten Truemper, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 15/815,518

(22) Filed: Nov. 16, 2017

(65) Prior Publication Data

US 2018/0134392 A1 May 17, 2018

(30) Foreign Application Priority Data

Nov. 17, 2016 (DE) .......................... 10 2016 222 650

(51) Int. Cl.
*B64D 11/04* (2006.01)
*A47B 31/02* (2006.01)
(Continued)

(52) U.S. Cl.
CPC .............. *B64D 11/04* (2013.01); *A47B 31/02* (2013.01); *A47B 31/06* (2013.01);
(Continued)

(58) Field of Classification Search
CPC ........ B64D 11/04; B64D 13/08; B64D 13/06; B64D 13/02; B64D 11/0007;
(Continued)

(56) References Cited

U.S. PATENT DOCUMENTS 4,361,014 A * 11/1982 Blain .................... A47J 39/006
62/237
4,437,320 A 3/1984 Eklund
(Continued)

FOREIGN PATENT DOCUMENTS

DE         4340317 C2      3/1996
DE     102006005035 B3     9/2007
(Continued)

OTHER PUBLICATIONS

German Search Report for German Application No. 10 2016 222 650.9 dated Jul. 11, 2017.

*Primary Examiner* — Emmanuel Duke
(74) *Attorney, Agent, or Firm* — Jenkins, Wilson, Taylor & Hunt, P.A.

(57) ABSTRACT

A cooling arrangement for a galley for installation in a transport apparatus includes a cooling energy consumer with a housing with a cooling fluid inlet opening and a cooling fluid outlet opening for the supply and removal of a cooling fluid to and from the housing. A cooling compartment includes an interior for taking up the cooling energy consumer, a cooling air inlet for supplying cooling air to the cooling compartment and a cooling air outlet for removing cooling air from the cooling compartment. The cooling air inlet can conduct the cooling air supplied to the interior over an outer surface of the cooling energy consumer. A conveying device is configured to conduct the cooling air supplied to the interior and conducted over the outer surface of the cooling energy consumer through the housing of the cooling energy consumer via the cooling fluid inlet opening and cooling fluid outlet opening.

17 Claims, 4 Drawing Sheets

(51) Int. Cl.
*A47B 31/06* (2006.01)
*B64D 13/08* (2006.01)
*B64D 11/00* (2006.01)
B64D 13/06 (2006.01)
A47B 31/00 (2006.01)

(52) U.S. Cl.
CPC .......... B64D 11/0007 (2013.01); B64D 13/08 (2013.01); *A47B 2031/002* (2013.01); *A47B 2031/023* (2013.01); *B64D 2013/0629* (2013.01)

(58) Field of Classification Search
CPC . B64D 2013/0629; A47B 31/06; A47B 31/02; A47B 2031/002; A47B 2031/023; B64C 11/04; B60H 1/00014
See application file for complete search history.

(56) References Cited

U.S. PATENT DOCUMENTS

| | | | |
|---|---|---|---|
| 4,969,509 A * | 11/1990 | Merensky | B64D 13/08 165/104.34 |
| 5,513,500 A | 5/1996 | Fischer et al. | |
| 5,655,595 A * | 8/1997 | Westbrooks, Jr. | A47J 39/006 165/48.1 |
| 7,780,114 B2 | 8/2010 | Doebertin et al. | |
| 8,713,950 B2 | 5/2014 | Roering | |
| 9,045,229 B2 | 6/2015 | Roering | |
| 2009/0000329 A1 | 1/2009 | Colberg et al. | |
| 2010/0251797 A1 | 10/2010 | Sperrer | |
| 2012/0025679 A1 * | 2/2012 | Roering | B64D 11/0007 312/236 |
| 2012/0312030 A1 * | 12/2012 | Lu | F25B 21/02 62/3.6 |
| 2013/0047657 A1 | 2/2013 | Oswald et al. | |
| 2013/0169130 A1 * | 7/2013 | Seeck | B64D 11/0007 312/236 |
| 2014/0102120 A1 * | 4/2014 | Libis | F25B 15/00 62/101 |
| 2015/0289643 A1 * | 10/2015 | Holtorf | B64D 11/0007 62/98 |
| 2016/0340044 A1 * | 11/2016 | Schalla | B64D 11/0007 |
| 2016/0340046 A1 * | 11/2016 | Moran | B64D 13/00 |

FOREIGN PATENT DOCUMENTS

| | | |
|---|---|---|
| DE | 102006023047 B4 | 1/2010 |
| DE | 102009011797 A1 | 9/2010 |
| DE | 102010031909 A1 | 1/2012 |
| DE | 102015210268 A1 | 12/2016 |
| DE | 102015210269 A1 | 12/2016 |
| DE | 102015210271 A1 | 12/2016 |
| EP | 2650216 B1 | 8/2014 |
| WO | WO 2007/080012 A1 | 7/2007 |
| WO | WO 2012/025200 A1 | 3/2012 |
| WO | WO 2016/193366 A1 | 12/2016 |
| WO | WO 2016/193372 A1 | 12/2016 |
| WO | WO 2016/193378 A1 | 12/2016 |

* cited by examiner

US 10,155,589 B2

COOLING ARRANGEMENT FOR A GALLEY AND METHOD FOR OPERATING SUCH A COOLING ARRANGEMENT

CROSS-REFERENCE TO RELATED APPLICATION

This application claims priority to German Patent Application DE 10 2016 222 650.9 filed Nov. 17, 2016, the entire disclosure of which is incorporated by reference herein.

TECHNICAL FIELD

The disclosure herein relates to a cooling arrangement for a galley provided for installation in a transport vehicle or apparatus, in particular an aircraft, and a galley equipped with such a cooling arrangement. The disclosure herein further relates to a method for operating such a cooling arrangement.

BACKGROUND

Modern airliners are normally equipped with onboard kitchens, so-called galleys, known for example from DE 10 2006 023 047 B4 or U.S. Pat. No. 7,780,114 B2. The galleys are usually installed in the doorway areas of the aircraft cabin and have a carcass with a base structure delimited by a worktop and top compartments arranged above the worktop. Kitchen appliances such as e.g. coffee machines, kettles, ovens etc. as well as drinks and food are normally accommodated in the top compartments of the galley. In the base structure of the galley, on the other hand, a trolley compartment is arranged to take up mobile trolleys, which are laden with objects, such as e.g. drinks and food, provided for dispensing to the passengers on board the aircraft.

Furthermore, aircraft galleys are known with trolley compartments that are provided to take up trolleys laden with goods to be cooled. Thus cooled drinks and food can be dispensed to the passengers on board the aircraft during the flight, for example. Such trolley compartments can have a decentralized cooling device with its own compression refrigeration machine, by which a cooling medium, usually cooling air, is provided for cooling the trolleys taken up in the trolley compartments. The use of a central cooling system of a transport vehicle or apparatus is also known, for example from DE 43 40 317 C2, DE 10 2006 005 035 B3, WO 2007/080012 A1, DE 10 2009 011 797 A1 and US 2010/0251797 A1, which comprises a central compression refrigeration machine, the cooling output of which is provided by a coolant circuit to a plurality of cooling units in the area of the aircraft galley. The cooling energy provided to the individual cooling units is transferred by the coolant circuit by a heat exchanger to a cooling medium to be supplied to a cooling unit, which medium is used to cool trolleys taken up in a trolley compartment.

Regardless of the manner in which the cooling energy is provided for cooling the trolleys taken up in the trolley compartments, a distinction is basically made between so-called "air-over" cooling arrangements and "air-through" cooling arrangements, which are described, for example, in DE 10 2010 031 909 A1 and WO 2012/025200 A1. The "air-over" cooling arrangements comprise a thermally insulated cooling chamber, which is sealed off in relation to its environment and in which at least one trolley laden with goods to be cooled is taken up. The trolleys used in the "air-over" cooling arrangements are not thermally insulated for their part. In contrast, the trolleys used in an "air-through" cooling arrangement have cooling air connections, which are connected to the decentralized cooling device or the central cooling system. In other words, the cooling air provided by the decentralized cooling device or the central cooling system is conducted via a cooling air line directly into the trolleys and thus to the goods to be cooled that are housed therein.

Compared with an "air-over" cooling arrangement, faster cooling of the goods to be cooled in the trolleys takes place in an "air-through" cooling arrangement. However, the trolleys used in the "air-through" cooling arrangements have a lower temperature relative to their surroundings on the outer surfaces of their housing when in operation. This results in water condensing on the outer surfaces of the housing of the trolleys from the warm, humid air surrounding the trolleys and collecting in a floor area of the compartment taking up the trolleys. To remove the condensate arising thus, a water drainage system is provided in the floor area of the compartment taking up the trolleys.

Furthermore, a cooling arrangement for an aircraft galley is known from EP 2 650 216 B1 that is based on a combination of the "air-over" and "air-through" cooling arrangements described above. The cooling arrangement comprises a cooling compartment with an interior in which at least one cooling energy consumer is accommodated. An air inlet distribution duct for supplying cooling air to the interior and an air outlet distribution duct for removing cooling air from the interior are arranged on a rear wall of the interior of the cooling compartment. The air inlet distribution duct comprises a cooling air inlet, which is configured to conduct cooling air into the interior of the cooling compartment so that this air is conducted over an outer surface of a housing of the cooling energy consumer. Furthermore, the air inlet distribution duct comprises another cooling air inlet, which is connected to a cooling fluid inlet formed in the housing of the cooling energy consumer and conducts cooling air into the housing of the cooling energy consumer. The air outlet distribution duct correspondingly comprises a cooling air outlet for removing the cooling air conducted into the interior of the cooling compartment and over the outer surface of the housing of the cooling energy consumer. The air outlet distribution duct further comprises another cooling air outlet for removing the cooling air conducted into the housing of the cooling energy consumer, which outlet is connected to a cooling fluid outlet formed in the housing of the cooling energy consumer.

SUMMARY

An object of the disclosure herein is to provide a cooling arrangement for installation in a galley provided in a transport vehicle or apparatus, which arrangement is installation-space-optimized and can be operated efficiently. The disclosure herein is further directed to the object of specifying a galley equipped with such a cooling arrangement. Finally, the object of the disclosure herein is to propose a method for operating such a cooling arrangement.

This object is achieved by a cooling arrangement(s) and method(s) such as disclosed herein.

A cooling arrangement for a galley provided for installation in a transport vehicle or apparatus, in particular an aircraft, comprises at least one cooling energy consumer. This can be constructed in the form of a mobile trolley, which is laden with goods to be cooled, such as drinks, food or other objects, for example, provided for dispensing to passengers of the transport vehicle or apparatus. The cooling energy consumer comprises a housing, which is provided with a cooling fluid inlet opening for supplying a cooling fluid to the housing and a cooling fluid outlet opening for removing the cooling fluid from the housing. In other words, a cooling fluid, preferably cooling air, can be conducted via the cooling fluid inlet opening into the housing of the cooling energy consumer and to the goods to be cooled taken up therein. The cooling fluid conducted through the housing of the cooling energy consumer and over the goods to be cooled can accordingly be removed from the housing of the cooling energy consumer through the cooling fluid outlet opening. While the cooling fluid is flowing through the housing of the cooling energy consumer, heat is transferred from the goods to be cooled, which are taken up in the cooling energy consumer, to the cooling fluid, due to which these goods are cooled.

The cooling arrangement further comprises a cooling compartment with an interior for taking up the at least one cooling energy consumer. The cooling compartment preferably has an access opening on the front side as well as a rear wall of the interior lying opposite the access opening. The at least one cooling energy consumer can be conveyed into the interior of the cooling compartment and out of the same via the front access opening. The cooling compartment can also have a door delimiting the interior for closing the access opening and be sealed off relative to the ambient atmosphere by a sealing system described in DE 10 2010 031 909 A1 or WO 2012/025200 A1. Furthermore, the interior of the cooling compartment is preferably thermally insulated from its environment.

The cooling compartment has a cooling air inlet for supplying cooling air to the interior of the cooling compartment and a cooling air outlet for removing the cooling air from the interior of the cooling compartment. The cooling air inlet is configured to conduct the cooling air supplied to the interior of the cooling compartment via an outer surface of the housing of the cooling energy consumer.

The cooling air inlet can be connected by a cooling air inlet line, through which cooling air can flow and which is arranged upstream of the cooling air inlet, to a cooling device for the provision of cooling energy. The term "upstream" and the term "downstream" here refer to the flow direction of the cooling air flowing through the cooling arrangement. The cooling device can be configured to transfer cooling energy to the cooling air flowing through the cooling air inlet line. In particular, the cooling device can have a heat exchanger, which is coupled thermally to the cooling air inlet line and transfers heat from the cooling air flowing through the cooling air inlet line to a coolant circuit of a compression refrigeration machine of the cooling device. As an example, the cooling device can be formed as a decentralized cooling device, for example in the form of a so-called "air chiller" or as a central cooling system of the transport vehicle or apparatus. The air cooled in such a manner and conducted into the interior of the cooling compartment preferably has a dew point temperature that is below a surface temperature of the trolley in the interior of the cooling compartment.

The cooling air outlet can be connected to a cooling air outlet line through which cooling air can flow. The cooling air, which is supplied to the interior of the cooling compartment and heated when flowing through the interior of the cooling compartment, can be removed from this via the cooling air outlet and the cooling air outlet line connected to it.

A conveying device of the cooling arrangement is configured to conduct the cooling air supplied to the interior of the cooling compartment and conducted over the outer surface of the housing of the cooling energy consumer via the cooling fluid inlet opening and cooling fluid outlet opening of the housing of the cooling energy consumer through the housing of the cooling energy consumer. In other words, the cooling air supplied to the interior of the cooling compartment has a flow path in which a cooling air flow supplied to the interior is conducted both over an outer surface of the housing of the cooling energy consumer and into the housing of the cooling energy consumer. The conveying device here ensures that cooling air, which flows in the interior of the cooling compartment along an outer surface of the housing of the cooling energy consumer, is conducted via the cooling fluid inlet opening of the housing of the cooling energy consumer into the housing of the cooling energy consumer. In the cooling arrangement proposed here, cooling fluid supply ducts and cooling fluid removal ducts or cooling fluid distribution ducts, which conduct a cooling fluid into and out of the cooling energy consumer, can accordingly be dispensed with. Compared with conventional "air-through" ducts, the cooling arrangement is thus characterized by a small installation space requirement, in particular a small installation depth.

By having a cooling air flow conducted in the interior of the cooling compartment both along an outer surface of the housing and through the housing of the cooling energy consumer in the cooling arrangement, the present disclosure is based on a combination of the "air-through" principle with the "air-over" principle.

According to the "air-through" principle, cooling air is conducted in the present cooling arrangement through the housing of the cooling energy consumer. In other words, the cooling air can thus be conducted directly to the goods to be cooled that are arranged in the housing of the cooling energy consumer. Rapid cooling of the goods in the trolleys can take place in this way.

Furthermore, according to the "air-over" principle, cooling air is conducted into the interior of the cooling compartment of the cooling arrangement taking up the cooling energy consumer, so that cooling air flows along an outer surface of the housing of the cooling energy consumer. Condensate formation on the outer surfaces of the housing of the cooling energy consumer, which as described above usually occurs with "air-through" cooling arrangements due to the entry of moist, warm ambient air into the compartment accommodating the energy consumer, can be prevented by this. Water drainage systems normally used in "air-through" cooling arrangements can thus also be eliminated in the present cooling arrangement.

To achieve an efficient flow through the housing of the cooling energy consumer, the conveying device can be connectable to the cooling fluid inlet opening and/or the cooling fluid outlet opening of the housing of the cooling energy consumer. If the conveying device is connectable to the cooling fluid inlet opening of the housing of the cooling energy consumer, the conveying device is preferably configured to aspirate cooling air from the interior of the cooling compartment and convey it into the housing of the cooling energy consumer via the cooling fluid inlet opening. After flowing through the housing of the cooling energy consumer, the cooling air then exits the housing of the cooling energy consumer again through the cooling fluid outlet opening. If the conveying device is connectable to the cooling fluid outlet opening of the housing of the cooling energy consumer, this is preferably configured to aspirate cooling air from the housing of the cooling energy consumer via the cooling fluid outlet opening and convey it into the interior of the cooling compartment. As a result of the pressure conditions arising thereby in the area of the cooling fluid inlet opening, cooling air flows out of the interior of the cooling compartment into the housing of the cooling energy consumer.

The conveying device is preferably arranged in the area of the rear wall of the interior of the cooling compartment. The conveying device can be connected to the rear wall of the cooling compartment. For example, the conveying device can be arranged on the rear wall, in particular on a surface facing the cooling energy consumer when this is accommodated in the interior of the cooling compartment. Alternatively the conveying device can be integrated into the rear wall of the interior of the cooling compartment. The cooling fluid inlet opening and/or the cooling fluid outlet opening is/are accordingly formed preferably in a rear wall of the housing of the cooling energy consumer. Alternatively the conveying device can be attached to the cooling energy consumer, in particular to the rear wall of the housing of the cooling energy consumer.

In the cooling energy consumer the cooling air flow is preferably conducted in such a way through the housing of the cooling energy consumer that the cooling energy provided by the cooling air flow is released uniformly onto the goods to be cooled arranged in the housing of the cooling energy consumer. This can be achieved, for example, by arranging the cooling fluid inlet opening in an upper section of the rear wall of the housing of the cooling energy consumer and the cooling fluid outlet opening in a lower section of the rear wall of the housing of the cooling energy consumer. In particular, this arrangement makes it possible that cooling air is supplied to the housing of the cooling energy consumer in an upper area of the housing of the cooling energy consumer, and is conveyed downward through the housing of the cooling energy consumer before it is conducted via the cooling fluid outlet opening out of a lower area of the housing of the cooling energy consumer. Other flow paths of the cooling air in and through the housing of the cooling energy consumer that deviate from this are naturally also conceivable. Depending on the configuration and size of the energy consumer, its housing can be provided with two or more cooling fluid inlet openings and/or cooling fluid outlet openings. Furthermore, the cooling energy consumer can comprise closing caps, which are configured to close the cooling fluid inlet opening and the cooling fluid outlet opening in a state in which the cooling energy consumer is not accommodated in the interior of the cooling compartment.

In a further development, the conveying device, in particular when this is connected to the rear wall of the interior of the cooling compartment or is integrated into it, can be adjustable relative to the rear wall of the cooling compartment, in particular height-adjustable. The conveying device can thereby be adapted in a simple manner to a cooling fluid inlet opening and/or cooling fluid outlet opening to be connected to it of an exchangeable cooling energy consumer that can be accommodated in the interior of the cooling compartment. A cooling arrangement equipped with such a conveying device is characterized by an easy configurability for taking up different, interchangeable cooling energy consumers. A modular construction of the cooling arrangement is accordingly provided by this.

The conveying device can be provided in the form of a blower or fan. In particular, the conveying device can be a radial fan, which has an axial opening through which cooling air can flow and a radial opening through which cooling air can flow. The radial fan can have a flat rear wall arranged opposed to the axial opening, which wall is arranged substantially perpendicular to the radial opening. In a fitted state of the radial fan in the cooling arrangement, its rear wall is preferably lying opposite, and is arranged in particular on the rear wall of the interior of the cooling compartment.

The axial opening of the conveying device is preferably connectable to the cooling fluid inlet opening or the cooling fluid outlet opening of the housing of the cooling energy consumer. In particular, the conveying device can be configured to aspirate cooling air via the radial opening from the interior of the cooling compartment and convey it via the axial opening and the cooling fluid inlet opening of the housing of the cooling energy consumer connectable thereto into the housing of the cooling energy consumer. The radial opening can be constructed accordingly as part of an inlet nozzle of the radial fan, wherein the axial opening forms a part of an outlet nozzle of the radial fan. Alternatively or in addition, the conveying device can be configured to aspirate cooling air via the axial opening and the cooling fluid outlet opening of the housing of the cooling energy consumer connectable thereto out of the housing of the cooling energy consumer and convey it via the radial opening into the interior of the cooling compartment. The radial opening can be constructed accordingly as part of an outlet nozzle of the radial fan, wherein the axial opening forms part of an inlet nozzle of the radial fan.

The cooling arrangement can also comprise further conveying devices. A number of conveying devices in this case preferably corresponds to a number of cooling energy consumers, which can be taken up simultaneously in the interior of the cooling compartment.

The cooling compartment of the cooling arrangement can further comprise a worktop, which forms an upper delimitation of the interior of the cooling compartment. In a further development, a section of the cooling air inlet line connected to the cooling air inlet and/or a section of the cooling air outlet line connected to the cooling air outlet can be integrated in the worktop. Due to the integration of the cooling air inlet line and/or the cooling air outlet line, at least in sections, in the worktop, installation space can be saved additionally. In particular, the arrangement of cooling air inlet lines and/or cooling air outlet lines in the area of the rear wall of the interior, and in particular in the interior of the cooling compartment, can be eliminated, due to which the installation space of the cooling arrangement can be further reduced in its depth.

To attain an advantageous flow path of the cooling air in and through the interior of the cooling compartment, in which a uniform flow around and through the housing of the cooling energy consumer arranged in the interior of the cooling compartment takes place, the cooling air inlet can be arranged in a floor area of the interior of the cooling compartment, wherein the cooling air outlet can be arranged in the area of the worktop of the cooling compartment. For example, the cooling air inlet line connected to the cooling air inlet can comprise a further section, which is arranged downstream of the section of the cooling air inlet line integrated in the worktop and is integrated in a side wall or an intermediate wall of the cooling compartment. In this case the cooling air inlet can be constructed downstream of the other section of the cooling air inlet line in the side wall or intermediate wall of the cooling compartment. The cooling air outlet can be connected to the cooling air outlet line upstream and formed in the worktop of the cooling compartment. An alternative arrangement of the cooling air inlet and the cooling air outlet is naturally likewise conceivable. For example, the cooling air inlet can be arranged in the area of the worktop and the cooling air outlet in the floor area of the interior of the cooling compartment in an alternative arrangement.

To reduce the humidity of the cooling air conducted into the interior of the cooling compartment and thereby prevent condensate formation in the interior, a water separator can be arranged in the cooling air inlet line upstream of the cooling air inlet, in particular in the other section of the cooling air inlet line. Furthermore, a filter can be provided in the cooling air outlet line, for example in the section integrated in the worktop, to remove odours and dirt from the cooling air flowing through the filter.

A galley provided for installation in a transport vehicle or apparatus comprises a cooling arrangement described above.

A cooling arrangement described above and/or a galley described above are/is particularly advantageously suitable for use in an aircraft.

A method for operating a cooling arrangement for a galley provided for installation in a transport vehicle or apparatus comprises a step of supplying cooling air to an interior of the cooling compartment of the cooling arrangement, in which a cooling energy consumer is accommodated, wherein the cooling air supplied to the interior of the cooling compartment is conducted over an outer skin of a housing of the cooling energy consumer. Furthermore, conducting of the cooling air supplied to the interior of the cooling compartment and conducted over the outer skin of the housing of the cooling energy consumer takes place through the housing of the cooling energy consumer by a conveying device and removal of the cooling air from the interior of the cooling compartment.

The conveying device can be arranged in the area of a rear wall of the interior of the cooling compartment. Furthermore, cooling air can be aspirated by the conveying device from the interior of the cooling compartment and conveyed into the housing of the cooling energy consumer. Alternatively or in addition, cooling air can be aspirated by the conveying device from the housing of the cooling energy consumer and conveyed into the interior of the cooling compartment.

BRIEF DESCRIPTION OF THE DRAWINGS

Preferred embodiments of the disclosure herein are now explained in greater detail with reference to the enclosed schematic drawings, in which.

DETAILED DESCRIPTION

Figure 1:
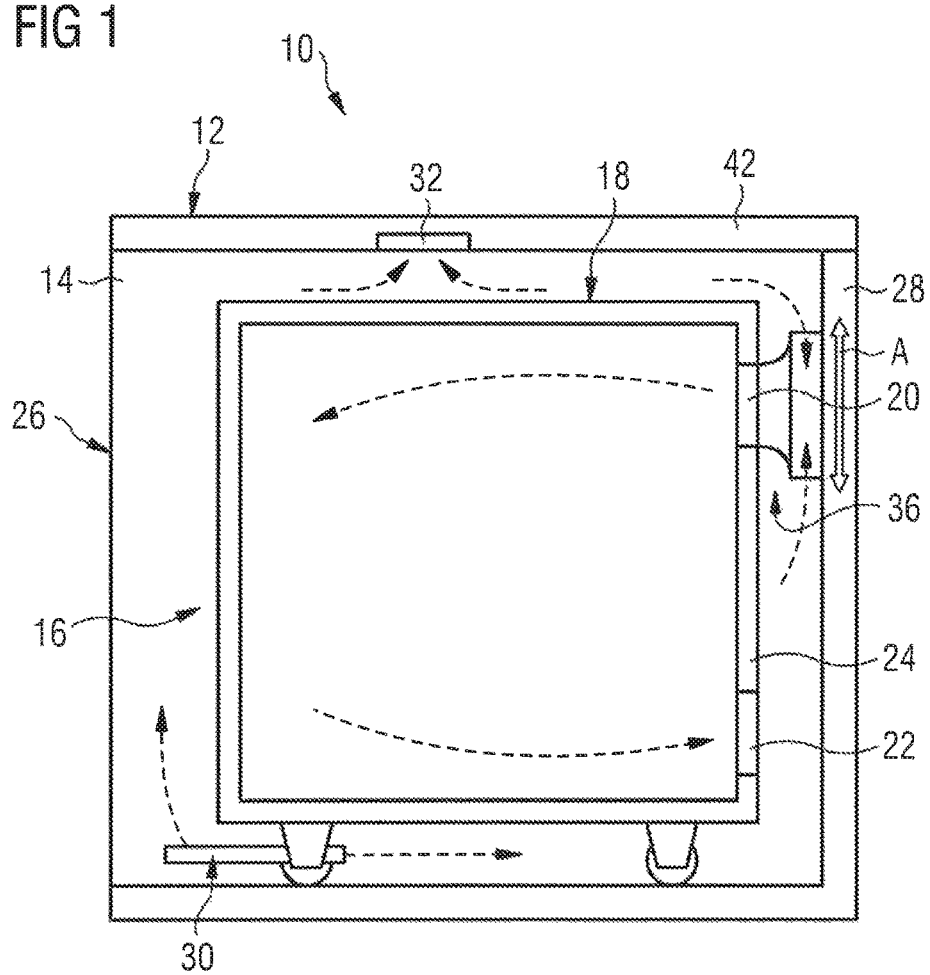
FIG. 1 shows a cross-sectional view of a cooling arrangement of a galley in an aircraft.

FIG. 1 shows a cross-sectional view of a cooling arrangement 10 of a galley, which is suitable in particular for installation in a passenger cabin of an airliner. The cooling arrangement 10 comprises a cooling compartment 12 with an interior 14, in which at least one cooling energy consumer 16 of the cooling arrangement 10 is taken up. The cooling energy consumer 16 is constructed in the form of a mobile trolley, which is laden with goods to be cooled, such as drinks, food or other objects provided for dispensing to passengers of the airliner, for example.

The cooling energy consumer 16 has a housing 18, which is provided with a cooling fluid inlet opening 20 for supplying a cooling fluid in the form of cooling air to the housing 18 and a cooling fluid outlet opening 22 for removing the cooling fluid from the housing 18. As indicated by the dashed arrows showing a flow path of the cooling air through the interior 14 and the housing 16 in FIG. 1, the cooling energy consumer 16 makes it possible for the cooling air to be conducted via the cooling fluid inlet opening 20 and the cooling fluid outlet opening 22 through the housing 18 of the cooling energy consumer 16 and to the goods to be cooled accommodated therein. The cooling fluid inlet opening 20 and the cooling fluid outlet opening 22 are constructed in a rear wall 24 of the housing 18 of the cooling energy consumer 16, wherein the cooling fluid inlet opening 20 is arranged in an upper area of the rear wall 24 and the cooling fluid outlet opening 22 is arranged in a lower area of the rear wall 24.

The cooling compartment 12 has an access opening 26 on the front and a rear wall 28 of the interior 14 lying opposite the access opening 26. The at least one cooling energy consumer 16 can be conveyed into the interior 14 of the cooling compartment 12 and out of the same via the front access opening 26. The cooling compartment 12 further comprises a door, which is not shown here for reasons of clarity and which delimits the interior 14 and is configured to close the interior 14 of the cooling compartment 12 and seal it from the ambient atmosphere. In a state of the cooling compartment 12 closed by the door, this compartment is thermally insulated relative to its ambient atmosphere.

Figure 2:
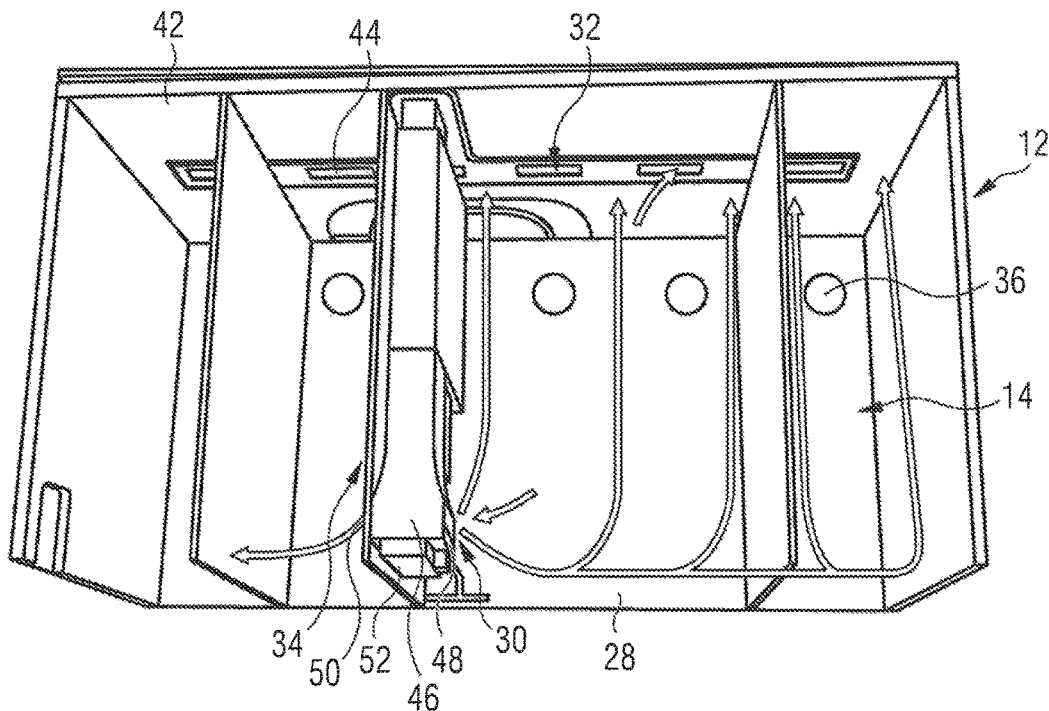
FIG. 2 shows a front view in perspective of the cooling arrangement according to FIG. 1.

As shown in FIG. 2, in which the at least one cooling energy consumer 16 is not shown for reasons of clarity, the cooling compartment 12 comprises a cooling air inlet 30 for supplying cooling air to the interior 14 of the cooling compartment 12 and a cooling air outlet 32 for removing the cooling air from the interior 14 of the cooling compartment 12. The cooling air inlet 30 is configured to conduct the cooling air supplied to the interior 14 of the cooling compartment 12 over an outer surface of the housing 18 of the cooling energy consumer 16, as indicated by the arrows in FIGS. 1 and 2 showing a flow path of the cooling air through the interior 14 of the cooling compartment 12. The cooling air inlet 30 is connected via a cooling air inlet line 34, through which cooling air can flow, upstream of the cooling air inlet 30 to a cooling device, not shown here, for the provision of cooling energy. The cooling air outlet 32 is connected to a cooling air outlet line, through which cooling air can flow and via which cooling air supplied to the interior 14 of the cooling compartment 12 and heated on flowing through the interior 14 of the cooling compartment 12 is removed from the same.

The cooling arrangement 10 further comprises at least one conveying device 36, which is configured to conduct the cooling air supplied to the interior 14 of the cooling compartment 12 and conducted over the outer surface of the housing 18 of the at least one cooling energy consumer 16 through the housing 18 of the cooling energy consumer 16 via the cooling fluid inlet opening 20 and cooling fluid outlet opening 22. In other words, the cooling air supplied to the interior 14 of the cooling compartment 12 has a flow path on which a cooling air flow supplied to the interior 14 is conducted both along the outer surface of the housing 18 and into the housing 18 of the cooling energy consumer 16. In this way the cooling arrangement 10 is based on a combination of the "air-over" principle with the "air-through" principle.

The conveying device 36 is arranged on the rear wall 28 of the interior 14 of the cooling compartment 12 and is connectable to the cooling fluid inlet opening 20 of the cooling energy consumer 16. Alternatively the conveying device 36 can also be integrated into the rear wall 28 of the interior 14 of the cooling compartment 12. The conveying device 36 is attached to the rear wall 28 of the interior 14 of the cooling compartment 12 or integrated into the rear wall 28 of the interior 14 of the cooling compartment 12 in this case in such a position that, when the cooling energy consumer 16 is pushed via the access opening 26 into the interior 14 of the cooling compartment 12 and reaches its stowage position, the cooling fluid inlet opening 20 and the conveying device 36 engage in one another and are thereby connected to one another.

To ensure a connection of the conveying device 36 to cooling fluid inlet openings 20 of different, interchangeable cooling energy consumers 16, which have a different construction, in particular with regard to the cooling fluid inlet opening 20 and the cooling fluid outlet opening 22, the conveying device 36 is height-adjustable relative to the rear wall 28 of the interior 14 of the cooling compartment 12, as indicated by arrow A in FIG. 1. The cooling arrangement 10 is thus characterized by a simple configurability for taking up different, interchangeable cooling energy consumers 16.

Figure 3:
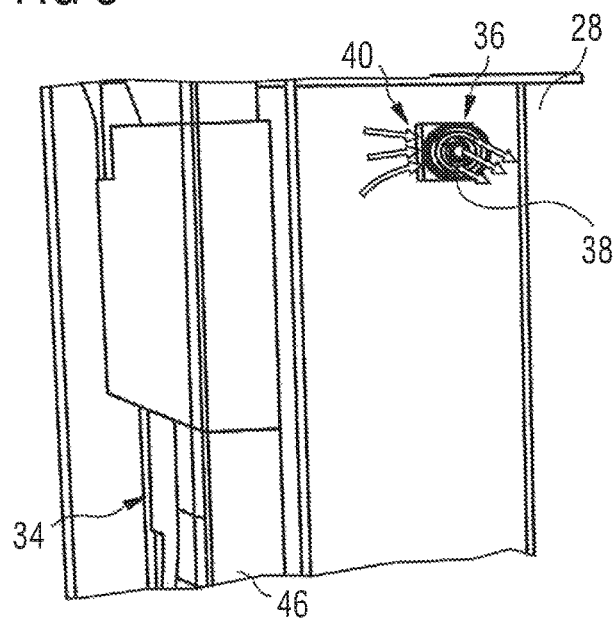
FIG. 3 shows an enlarged view in perspective of a conveying device of the cooling arrangement according to FIG. 1.

FIG. 3 shows an enlarged view of the conveying device 36, which is provided in the form of a radial fan. The conveying device 36 accordingly comprises an axial opening 38 through which cooling air can flow and a radial opening 40 through which cooling air can flow. The conveying device 36 has a flat rear wall, which is arranged opposite the axial opening 38 and is constructed substantially perpendicular to the radial opening 40. The rear wall of the conveying device 36 is attached to the rear wall 28 of the interior 14 of the cooling compartment 12. The use of a radial fan as conveying device 36 has the advantageous effect that the space requirement of the conveying device 36 and thereby the installation space of the cooling arrangement 10 can be reduced.

The axial opening 38 of the conveying device 36 is provided to be connected to the cooling fluid inlet opening 20 of the housing 18 of the cooling energy consumer 16. In particular, the conveying device 36 is configured to aspirate cooling air via the radial opening 40 from the interior 14 of the cooling compartment 12 and convey it via the axial opening 38 and the cooling fluid inlet opening 20 of the housing 18 of the cooling energy consumer 16 that is connectable to this into the housing 18 of the cooling energy consumer 16. Alternatively or in addition, the conveying device can be configured to aspirate cooling air via the axial opening 38 and the cooling fluid outlet opening 22 of the housing 18 of the cooling energy consumer 16 that is connectable to this out of the housing 18 of the cooling energy consumer 16 and convey it via the radial opening 40 into the interior 14 of the cooling compartment 12. In other words, the cooling air conducted through the conveying device 36 can be conveyed in opposite directions depending on the operating mode of the conveying device 36.

In particular, the cooling compartment 12 of the cooling arrangement 10 is configured to take up five cooling energy consumers 16 in total adjacent to one another in the interior 14, as indicated in FIG. 2. The cooling arrangement 10 here accordingly comprise five conveying devices 36 arranged adjacent to one another, which are each associated with a cooling energy consumer 16 to be taken up in the interior 14 of the cooling compartment 12.

The cooling compartment 12 further comprises a worktop 42, which forms an upper delimitation of the interior 14 of the cooling compartment 12. A section of the cooling air inlet line 34 connected to the cooling air inlet 30 and a section of the cooling air outlet line connected to the cooling air outlet 32 are integrated in the worktop 42.

The cooling air outlet 32 is integrated in the worktop and has several cooling air outlet openings 44 corresponding to the number of cooling energy consumers 16 that can be taken up simultaneously in the interior 14 of the cooling compartment 12. The cooling air outlet openings 44 are each associated with a cooling energy consumer 16 to be taken up in the interior 14 of the cooling compartment 12.

The cooling air inlet line connected to the cooling air inlet 30 comprises another section, which is arranged downstream of the section of the cooling air inlet line integrated in the worktop 42 and is integrated in an intermediate wall 46 of the cooling compartment 12. The cooling air inlet 30 is likewise integrated in the intermediate wall 46 of the interior 14 of the cooling compartment and comprises a first and a second cooling air inlet opening 48, 50, which are constructed on opposite side surfaces of the intermediate wall 46.

Arranged in the cooling air inlet line 34 upstream of the cooling air inlet 30 in the other section of the cooling air inlet line is a water separator 52, which is configured to remove moisture from the cooling air to be supplied to the interior 14 of the cooling compartment 12, i.e. to separate water drops from the cooling air.

Figure 4:
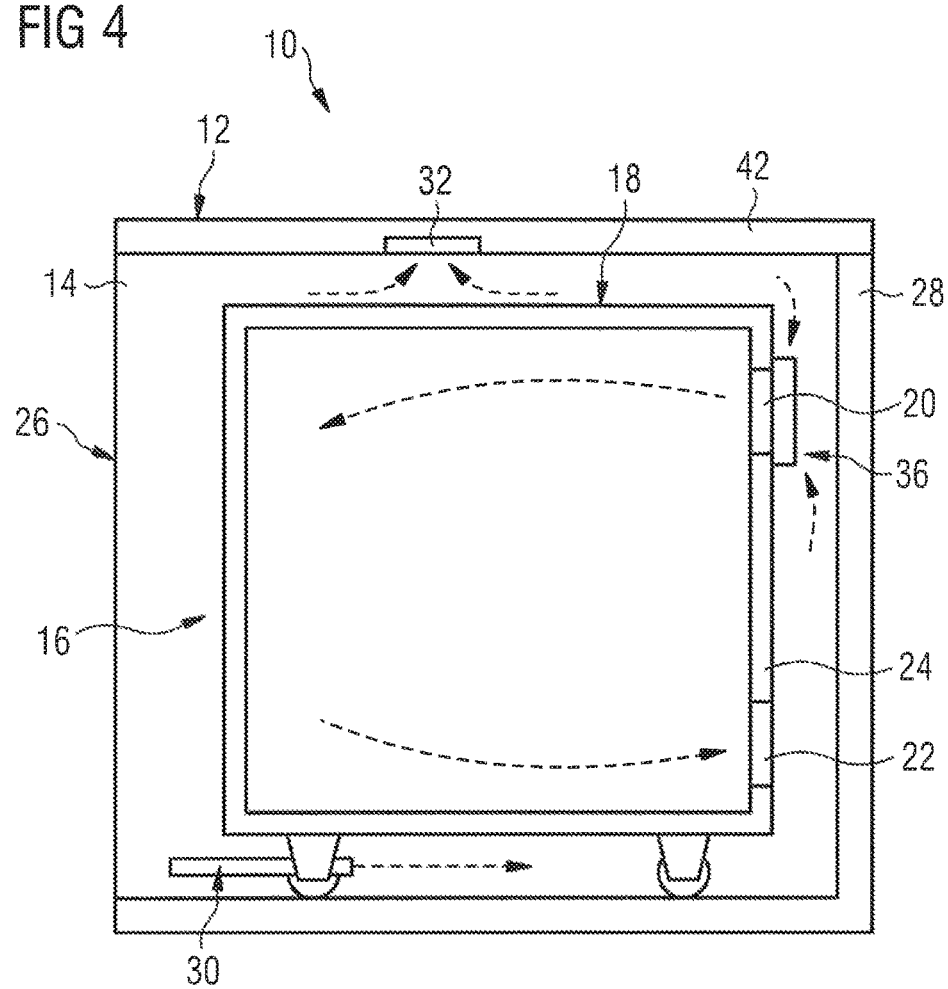
FIG. 4 shows a cross-sectional view of another embodiment of a cooling arrangement of a galley in an aircraft.

FIG. 4 shows another embodiment of the cooling arrangement 10, in which compared with the embodiment shown in FIGS. 1 through 3 the at least one conveying device 36 is attached to the rear wall 24 of the housing 18 of the cooling energy consumer 16. In other words, in the arrangement according to FIG. 4, the conveying device 36 is not attached to the rear wall 28 of the interior 14 of the cooling compartment 12 or integrated into the rear wall 28 of the interior 14 of the cooling compartment 12, but is formed as part of the cooling energy consumer 16.

Figure 5:
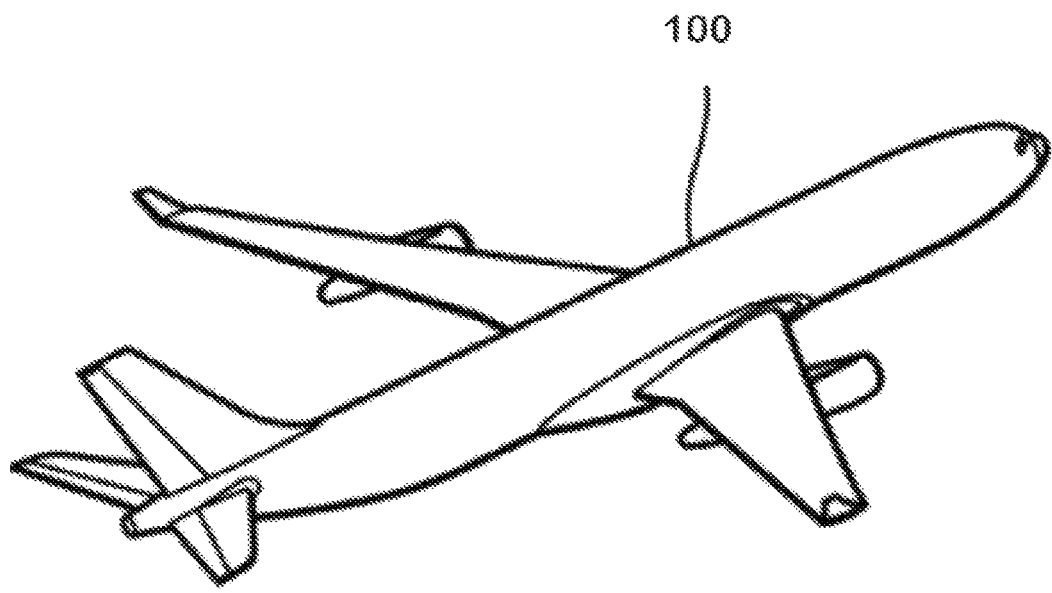
FIG. 5 shows an example transport vehicle.

FIG. 5 shows an embodiment of a transport apparatus 100, in this case an aircraft, in which a cooling arrangement 10 can be used.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cooling arrangement for a galley for installation in a transport apparatus, comprising: a cooling energy consumer with a housing, wherein the housing comprises a cooling fluid inlet opening for supplying a cooling fluid to the housing and a cooling fluid outlet opening for removing the cooling fluid from the housing; a cooling compartment with an interior for taking up the cooling energy consumer, wherein the cooling compartment comprises a cooling air inlet for supplying cooling air to the interior of the cooling compartment and a cooling air outlet for removing the cooling air from the interior of the cooling compartment, wherein the cooling air inlet is configured to conduct the cooling air supplied to the interior of the cooling compartment over an outer surface of the housing of the cooling energy consumer; and a conveying device configured to conduct the cooling air, which is supplied to the interior of the cooling compartment and conducted over the outer surface of the housing of the cooling energy consumer, through the housing of the cooling energy consumer via the cooling fluid inlet opening and the cooling fluid outlet opening.

2. The cooling arrangement according to claim 1, wherein the conveying device is connectable to at least one of the cooling fluid inlet opening and the cooling fluid outlet opening of the housing of the cooling energy consumer.

3. The cooling arrangement according to claim 1, wherein the conveying device is arranged in an area of a rear wall of the interior of the cooling compartment, and is arranged on the rear wall of the cooling compartment or is integrated into the rear wall of the cooling compartment.

4. The cooling arrangement according to claim 3, wherein at least one of the cooling fluid inlet opening and the cooling fluid outlet opening is formed in a rear wall of the housing of the cooling energy consumer.

5. The cooling arrangement according to claim 3, wherein the conveying device is adjustable, in particular height-adjustable, relative to the rear wall of the interior of the cooling compartment.

6. The cooling arrangement according to claim 1, wherein the conveying device is a radial fan, which has an axial opening through which cooling air can flow and a radial opening through which cooling air can flow, wherein the axial opening of the conveying device is connectable to the cooling fluid inlet opening or the cooling fluid outlet opening of the housing of the cooling energy consumer.

7. The cooling arrangement according to claim 6, wherein the conveying device is configured to aspirate cooling air via the radial opening from the interior of the cooling compartment and convey cooling air via the axial opening and the cooling fluid inlet opening of the housing of the cooling energy consumer that is connectable thereto into the housing of the cooling energy consumer.

8. The cooling arrangement according to claim 6, wherein the conveying device is configured to aspirate cooling air via the axial opening and the cooling fluid outlet opening of the housing of the cooling energy consumer that is connectable thereto from the housing of the cooling energy consumer and to convey cooling air via the radial opening into the interior of the cooling compartment.

9. The cooling arrangement according to claim 1, wherein the cooling compartment comprises a worktop, which forms an upper delimitation of the interior of the cooling compartment, wherein at least one of a section of a cooling air inlet line connected to the cooling air inlet and a section of a cooling air outlet line connected to the cooling air outlet is integrated in the worktop.

10. The cooling arrangement according to claim 9, wherein the cooling air inlet line connected to the cooling air inlet comprises another section, which is arranged downstream of the section of the cooling air inlet line integrated in the worktop and is integrated in a side wall or an intermediate wall of the cooling compartment.

11. The cooling arrangement according to claim 10, further comprising a water separator arranged in the cooling air inlet line upstream of the cooling air inlet, in particular in the other section of the cooling air inlet line.

12. A galley for installation in the transport apparatus, the galley comprising the cooling arrangement according to claim 1.

13. A method of using at least one of a cooling arrangement and a galley in an aircraft, the cooling arrangement comprising: a cooling energy consumer with a housing, which comprises a cooling fluid inlet opening for supplying a cooling fluid to the housing and a cooling fluid outlet opening for removing the cooling fluid from the housing; a cooling compartment with an interior for taking up the cooling energy consumer, wherein the cooling compartment comprises a cooling air inlet for supplying cooling air to the interior of the cooling compartment and a cooling air outlet for removing the cooling air from the interior of the cooling compartment, wherein the cooling air inlet is configured to conduct the cooling air supplied to the interior of the cooling compartment over an outer surface of the housing of the cooling energy consumer; and a conveying device configured to conduct the cooling air, which is supplied to the interior of the cooling compartment and conducted over the outer surface of the housing of the cooling energy consumer, through the housing of the cooling energy consumer via the cooling fluid inlet opening and the cooling fluid outlet opening; and the galley comprising the cooling arrangement.

14. A method for operating a cooling arrangement for a galley for installation in a transport apparatus, the method comprising: supplying cooling air to an interior of a cooling compartment of the cooling arrangement, wherein a cooling energy consumer is taken up, wherein the cooling air supplied to the interior of the cooling compartment is conducted over an outer skin of a housing of the cooling energy consumer; conducting the cooling air supplied to the interior of the cooling compartment and conducted the cooling air via the outer skin of the housing of the cooling energy consumer through the housing of the cooling energy consumer by a conveying device; and removing the cooling air from the interior of the cooling compartment.

15. The method according to claim 14,
wherein the conveying device is arranged in the area of a rear wall of the interior of the cooling compartment, and is arranged on the rear wall of the cooling compartment or integrated into the rear wall of the cooling compartment.

16. The method according to claim 14,
wherein cooling air is aspirated by the conveying device from the interior of the cooling compartment and is conveyed into the housing of the cooling energy consumer.

17. The method according to claim 14,
wherein cooling air is aspirated from the housing of the cooling energy consumer and conveyed to the interior of the cooling compartment.

\* \* \* \* \*